US008412766B1

(12) United States Patent
Meymann et al.

(10) Patent No.: US 8,412,766 B1
(45) Date of Patent: Apr. 2, 2013

(54) METHOD AND APPARATUS FOR TRACKING CLIENT NAVIGATION AMONG MULTIPLE RESOURCES IN COMMUNICATION SESSION INFORMATION SAVED BY A SERVER

(75) Inventors: Yardena Meymann, Beit Shemesh (IL); Joseph Weisblatt, Beit Shemesh (IL)

(73) Assignee: Cisco Technology, Inc., San Jose, CA (US)

( * ) Notice: Subject to any disclaimer, the term of this patent is extended or adjusted under 35 U.S.C. 154(b) by 2502 days.

(21) Appl. No.: 10/274,169

(22) Filed: Oct. 17, 2002

(51) Int. Cl.
G06F 15/16 (2006.01)
G06F 15/173 (2006.01)

(52) U.S. Cl. ......... 709/203; 709/217; 709/218; 709/219

(58) Field of Classification Search .................. 709/203, 709/217, 218, 219, 223, 229, 224
See application file for complete search history.

(56) References Cited

U.S. PATENT DOCUMENTS

| | | | | |
|---|---|---|---|---|
| 5,712,979 | A * | 1/1998 | Graber et al. | 709/224 |
| 5,812,769 | A * | 9/1998 | Graber et al. | 709/228 |
| 5,819,285 | A * | 10/1998 | Damico et al. | 707/104.1 |
| 5,854,630 | A * | 12/1998 | Nielsen | 715/739 |
| 5,974,455 | A * | 10/1999 | Monier | 709/223 |
| 6,125,395 | A * | 9/2000 | Rosenberg et al. | 709/228 |
| 6,141,666 | A * | 10/2000 | Tobin | 715/207 |
| 6,310,630 | B1 * | 10/2001 | Kulkarni et al. | 715/776 |
| 6,370,537 | B1 | 4/2002 | Gilbert et al. | |
| 6,405,238 | B1 * | 6/2002 | Votipka | 709/203 |
| 6,421,729 | B1 * | 7/2002 | Paltenghe et al. | 709/229 |
| 6,496,857 | B1 * | 12/2002 | Dustin et al. | 709/219 |
| 6,633,316 | B1 * | 10/2003 | Maddalozzo et al. | 715/854 |
| 6,704,732 | B1 * | 3/2004 | Barclay | 1/1 |
| 6,734,886 | B1 * | 5/2004 | Hagan et al. | 715/853 |
| 6,742,030 | B1 * | 5/2004 | MacPhail | 709/224 |
| 6,766,370 | B2 * | 7/2004 | Glommen et al. | 709/224 |
| 6,850,975 | B1 * | 2/2005 | Danneels et al. | 709/224 |
| 6,873,982 | B1 * | 3/2005 | Bates et al. | 707/5 |
| 6,915,336 | B1 * | 7/2005 | Hankejh et al. | 709/219 |
| 7,013,289 | B2 * | 3/2006 | Horn et al. | 705/14.51 |
| 7,107,338 | B1 * | 9/2006 | Nareddy et al. | 709/224 |
| 7,210,094 | B2 * | 4/2007 | Dovin et al. | 715/240 |
| 7,249,315 | B2 * | 7/2007 | Moetteli | 715/234 |
| 2002/0004735 | A1 * | 1/2002 | Gross | 705/10 |
| 2002/0023159 | A1 * | 2/2002 | Vange et al. | 709/228 |

(Continued)

OTHER PUBLICATIONS

Hoffman, Paul, "Netscape and the World Wide Web for Dummies", 1996, 2nd, pp. 36-38,81-93,117-125.*

*Primary Examiner* — Backhean Tiv
(74) *Attorney, Agent, or Firm* — Hickman Palermo Truong Becker Bingham Wong LLP

(57) ABSTRACT

Techniques for tracking navigation by a client among multiple content provided by servers include receiving from the client a first request for first content. In response to receiving the first request, a first response identification is generated that is unique among all responses during a communication session. Information associated with the first request is stored in a data structure in a first record associated with the first response identification. A linking element in the first content is determined. Selection of the linking element causes the client to generate a second request for second content. The first response identification is associated with the linking element in a first response such that the second request includes the first response identification. The first response is sent to the client. The tracking succeeds with multiple windows and limitations on state information passed by a client.

35 Claims, 9 Drawing Sheets

U.S. PATENT DOCUMENTS

| | | | |
|---|---|---|---|
| 2002/0046281 A1* | 4/2002 | Cope | 709/227 |
| 2002/0069122 A1* | 6/2002 | Yun et al. | 705/26 |
| 2003/0023511 A1* | 1/2003 | Gardner, Sr. | 705/27 |
| 2003/0023513 A1* | 1/2003 | Festa et al. | 705/27 |

* cited by examiner

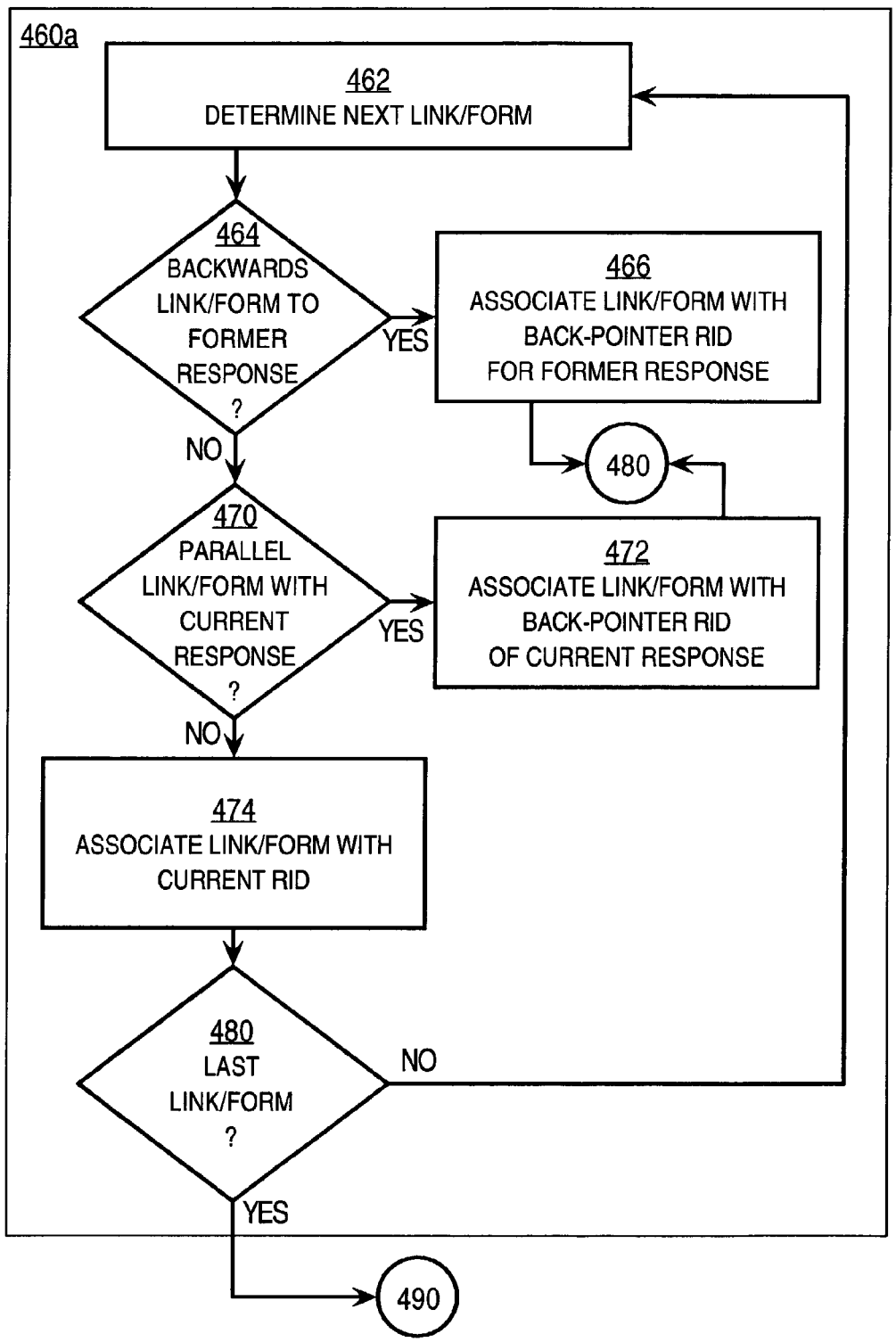

METHOD AND APPARATUS FOR TRACKING CLIENT NAVIGATION AMONG MULTIPLE RESOURCES IN COMMUNICATION SESSION INFORMATION SAVED BY A SERVER

FIELD OF THE INVENTION

The present invention generally relates to data processing, including managing state information generated during client use of multiple resources provided by servers. The invention relates more specifically to techniques for tracking navigation of a client through resources provided by servers within the state information saved by the servers.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The World Wide Web includes a network of servers on the Internet, each of which hosts one or more HTML (Hypertext Markup Language) pages, also called "web pages." The HTML pages associated with a server provide information and hypertext links to other documents on that and other servers. The links include a Universal Resource Locator (URL) that is used to determine the location of web pages and other resources on the network.

Web servers communicate with clients by using the Hypertext Transfer Protocol (HTTP). The web servers listen for requests from clients for their HTML pages and respond by sending the requested pages to the clients. Servers may respond to browser requests by sending a static web page or by performing dynamic operations. For example, a server may respond to a request by issuing a query to a database, dynamically constructing a web page containing the results of the query, and transmitting the dynamically constructed HTML page to the requesting browser.

Users of the World Wide Web use a client program, such as a browser, to request, decode and display information from web servers. When the user of a browser selects a link on an HTML page, the browser that is displaying the page sends a request over the Internet to the server associated with the URL specified in the link. In response to the request, the server transmits the requested information to the browser that issued the request. The browser receives the information, presents the received information to the user, and awaits the next user action to initiate a new request.

In an attempt to tailor the web user's experience to match the web user's interests, providers of web sites use one or more servers to provide an array of web pages that may be navigated by the user in an order according to the interests of the user.

HTTP, the protocol used to send web pages to clients, is a stateless protocol by design. That is, each message sent using HTTP is independent of other messages sent before or after in time. This is an advantage in many circumstances. For example, it simplifies the programming of the browser, which need not keep and manage collections of prior pages. It also reduces the computational demands on the device that hosts the browser. For example, the device need not have a large amount of storage, and the device need not consume time on its processor associating a received page with prior pages.

However, there are some disadvantages to a stateless protocol. For example, a completely stateless protocol does not support a complex transaction that obtains information from a user and generates data over several different web pages. The information generated by the server and sent to the client in response to one request is not necessarily conveyed to the server in a second request from the same user using the same browser. To circumvent the stateless nature of HTTP, web browsers have been extended in some approaches to include some information received from a web server in subsequent requests to the same or other servers.

In one approach, called "URL encoding," the URL field in a link is extended to include characters not used to specify a particular web page. The server provides the data in the URL field, including the formal URL that does specify a web page and any extra characters. The extended URL with the extra characters is included in any user request directed to the web page identified by the formal URL within the extended URL field. The extra characters may be used to record state information that will be supplied to the server that responds to requests for the web page.

A problem with this approach is that the URL field is limited to a particular number of characters, called hereinafter the URL field character limit. For example, in some implementations of this approach, the URL field character limit is 1024 characters. The URL field character limit may prevent a substantial amount of state information involved in more complex transactions from being included in the extended URL field.

In another approach, the browser writes a file, often called a "cookie," in client storage in response to receiving a web page that indicates a cookie should be written. The browser associates the cookie with the server that sent the web page. The web page sent by the server indicates the information to be placed in the cookie. The next time the browser sends a request to the same server, the contents of the cookie are included.

A problem with this approach is that each cookie written by the browser for a particular server overwrites any previous cookie for that server. Thus, the web server cannot cause the browser to add information to an existing cookie while retaining other information already in the cookie. The server must accumulate the information in the cookie and send back the combined information for the new cookie. This causes the same information to be passed back and forth over the network, consuming valuable network bandwidth for redundant information. Furthermore, cookies don't differentiate between different browser windows.

In conventional approaches using URL-encoding and cookies, a session object is formed on a host on which the server is executing. The session object stores and manages the state information returned by the browser. The session object on the server host is associated with the browser, as identified by a network address for the host on which the browser is executing.

A problem arises when the user goes back to a previously visited web page and branches. Depending on the application supported by the server, the state information that applies at that previously visited page may be different from the state information that applies if the user proceeds forward to the same web page. For example, a user who has made two purchases using two different credit cards visits the credit card input page twice. If the user hits the back button on the browser and returns to the first credit card input page, the user would like to see the credit card information for the first credit card. That information might be overwritten in the URL field or cookie by the credit card information that was input for the second purchase. The user would have to regenerate the first information, which is tedious, unnecessary and undesirable.

Even if the session object retains information input for both credit cards, the information for the second credit card is not applicable at the back-visited page. Both visits are recorded in the same session object because both come from the same browser. The server often has no basis in the session object to distinguish the two visits. Both visits are in response to requests for the same web page from the same browser.

A problem also arises when a user executes several instances of a browser on the same device. Each browser instance opens a different display area (called a "window") on the user's display device. Each browser instance has the same network address and therefore appears to the server as if it belongs to the same session object as other browser instances on the same host. If the same web page is opened by the two instances, the two windows are indistinguishable on the server side. The cookie written for the second visit is likely to overwrite the cookie written for the first visit.

Based on the foregoing, there is a clear need for techniques that manage state information at a server, which are robust in the presence of long navigational histories, backwards navigation and branching, and navigation in multiple browser windows during a communications session with a client.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4B is a flow diagram that illustrates an embodiment of a step depicted in FIG. 4A.

DETAILED DESCRIPTION OF THE PREFERRED EMBODIMENT

Figure 1:
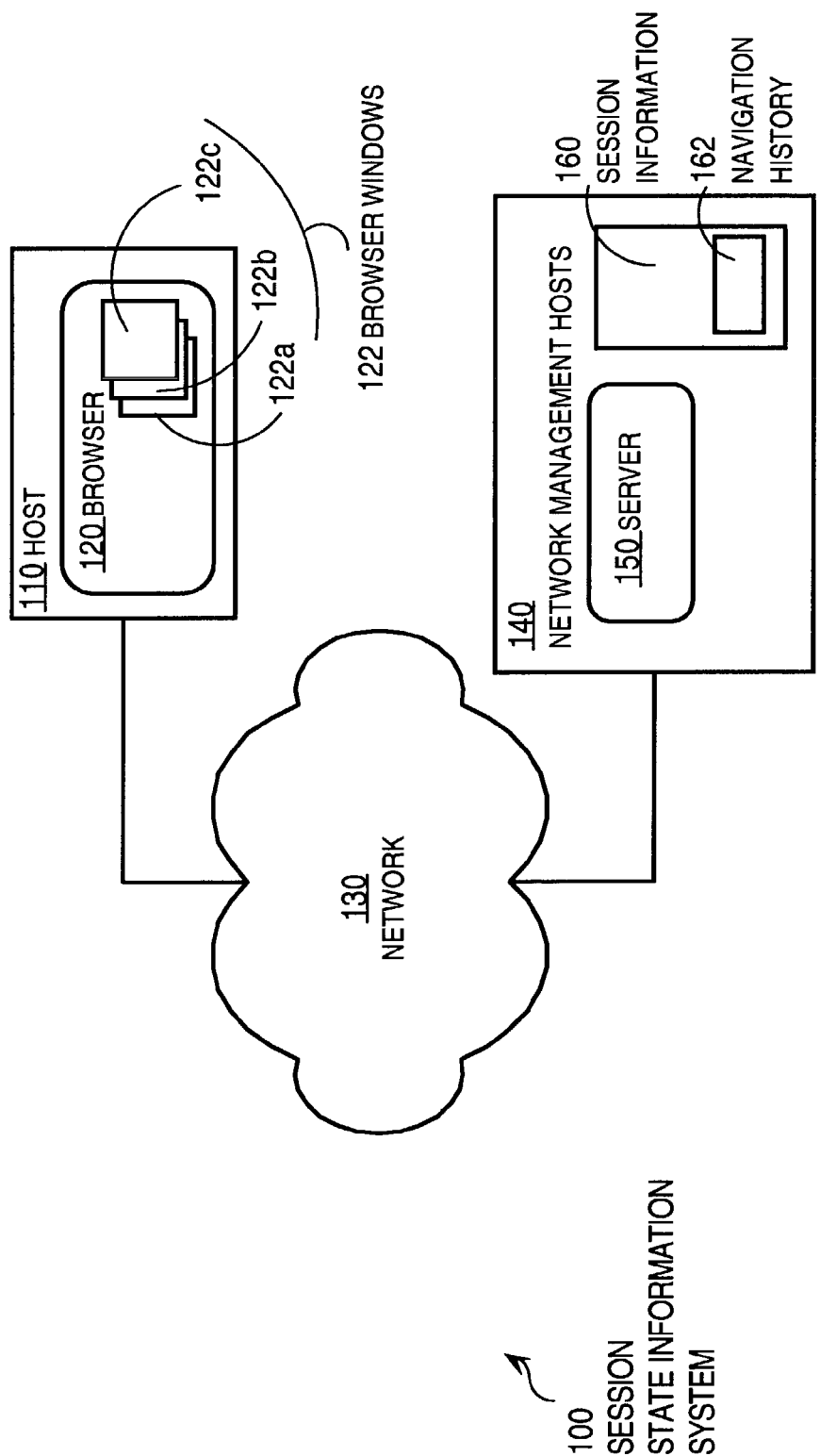
FIG. 1 is a block diagram that illustrates an overview of a system for tracking client navigation in session information saved by a server, according to an embodiment.

A method and apparatus are described for tracking client navigation among multiple resources in communication session information saved by a server. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Session Information Data Structure
   2.2 Linking Items in a Response
   2.3 Subsequent Request
3.0 Method For Tracking Client Navigation Among Multiple Resources In Session Information Saved By A Server
   3.1 Process of Tracking Forward Navigation
   3.2 Process of Tracking Forward Navigation in Multiple Windows
   3.3 Process of Tracking Backward Navigation
   3.4 Process of Tracking Parallel Navigation
4.0 Implementation Mechanisms—Hardware Overview
5.0 Extensions and Alternatives 1.0 General Overview The needs identified in the foregoing Background, and other needs that will become apparent for the following description, are achieved in the present invention, which comprises, in one aspect, a method for tracking navigation by a client, among multiple content components provided by one or more servers, in communication session information saved by the servers. During a communication session with the servers, a first request is received from the client. The first request is for a first content component of the multiple content components. In response to receiving the first request, a first response identification is generated that is unique among all responses to requests for any content component during the communication session. Information associated with the request is stored in a first record of a data structure. The first record is associated with the first response identification. A linking element is found in the first content component. Selection of the linking element causes the client to generate a second request for a second content component. The first response identification is associated with the linking element in a first response such that the second request includes the first response identification. The first response is sent to the client.

In other aspects, the invention encompasses a computer apparatus and a computer readable medium, including a carrier wave, configured to carry out the foregoing steps.

The unique response identification (RID) allows a server to store desired state information locally in association with the RID and then pass only the RID to the client in a cookie or with URL-encoding, or other mechanism. All the state information desired for the page need not be sent over the network, thus saving valuable network bandwidth and avoiding size limitations for cookies and URL fields and other mechanisms. Using various embodiments of the invention, tracking client navigation among multiple web pages is robust in the presence of multiple windows, backward navigation, parallel navigation, bandwidth limitations, and limitations in the sizes of URL fields and cookies.

In order to clearly describe an example of the invention in the following sections, one particular embodiment is described in the context of a set of web servers executing on one or more hosts for a web-based network management application accessed by a web browser. However, embodiments are not confined to this context, and may include other network servers providing other network resources among which any client may navigate at the discretion of the client's user. For example, in some embodiments, the client is an extensible markup language (XML) client receiving services and XML documents from servers for a financial application; where the server maintains state information about the sequence of services and XML documents requested or received by the client, or both.

2.0 Structural and Functional Overview

FIG. 1 is a block diagram that illustrates an overview of a system for tracking client navigation in session information saved by a server, according to an embodiment. A network management application is provided by a set of one or more web servers executing on a set of one or more network management hosts 140 connected to network 130. The network management application is used to manage at least some of the devices that compose network 130; for example, by showing the current status and configuration of the network devices, and by providing tools to change the configuration of those devices to perform different network functions. Server 150 is one of the servers in the set of one or more servers that provide the network management application.

A web client, browser 120, executes on host 110 connected to the network 130. Using the browser 120, a user may manage devices in network 130 by sending web requests to server 150 based on web pages sent to browser 120 and displayed by the browser 120. In the illustrated embodiment, browser 120 displays web pages to a user in any of one or more browser windows 122.

Often the browser displays successive web pages in the same window, e.g. window 122a, with the most recent web page replacing previously received web pages. Sometimes a navigation tool is maintained by the browser that lists the sequence of web pages displayed in the window in the order received. The list is sometimes called "breadcrumbs" by analogy to the fable of "Hansel & Gretel," in which characters mark a journey into a forest by dropping breadcrumbs. The user can return to a previous web page by using a pointing device to position a cursor over a listed web page in the breadcrumbs. As a user returns to a previous page, the pages visited in the interim may be removed from the breadcrumbs.

Sometimes, the web page received by the browser is displayed in a separate window, e.g., window 122b, leaving the previous web page unchanged in its window. For example, the web server may include a command in the web page that directs the browser to open a new window, e.g., window 122b, to display the contents of the new web page. The previous web page is still displayed in the previous window, e.g., window 122a. In another example, the user may select a link on the web page by using a pointing device to place a cursor over the link displayed, and then simultaneously depressing the control key and the "N" key on the user's keyboard so that the web page returned from that link is displayed in a separate window, e.g., window 122c. The user may then toggle back and forth among the simultaneously open windows 122a, 122b, 122c, using the cursor controlled by a pointing device.

In the description herein, for purposes of illustrating a clear example, a user is described as selecting certain links to result in certain responses. However, all user selection operations described herein also may be performed programmatically by a software process or system, and embodiments are not limited to user selection.

To retain state information in a complex transaction that involves several web pages, the server 150 stores session information 160. The user's selection of a sequence of web pages is marked on the server side by including navigation history information 162 in the session information 160.

Retaining navigation history information 162 on the server side is important in many applications. For example, in the illustrated application, the user may have come to a web page for displaying security settings information for a network device twice, once for a first device, and again for a second device. The user may then wish to toggle between the two pages (either using the breadcrumbs or using two windows 122a, 122b maintained by the browser) to compare or copy the security settings information on the two pages. For the server 150 to give a correct response, the server should retain a memory of the information displayed in the two windows and should include enough information in the navigation history 162 to distinguish the two visits to the security setting page.

Conventional servers identify each page by a page identification, e.g., a security settings page title, that does not distinguish between two visits to the same page. Conventional servers use cookies or URL-encoding to distinguish the two visits.

In the system and method herein, the server generates a unique response identification (RID) that distinguishes among multiple visits to the same page. The server stores the RID in association with state information for the page. The RID is then used in cookies or URL-encoding, or other mechanisms available at the time a system is developed, to associate all the state information stored at the server with the next request from the client, without having to pass all that state information over the network in a cookie or URL-encoding or other mechanism. Client navigation is then tracked using a linked list of RID values.

Figure 2:
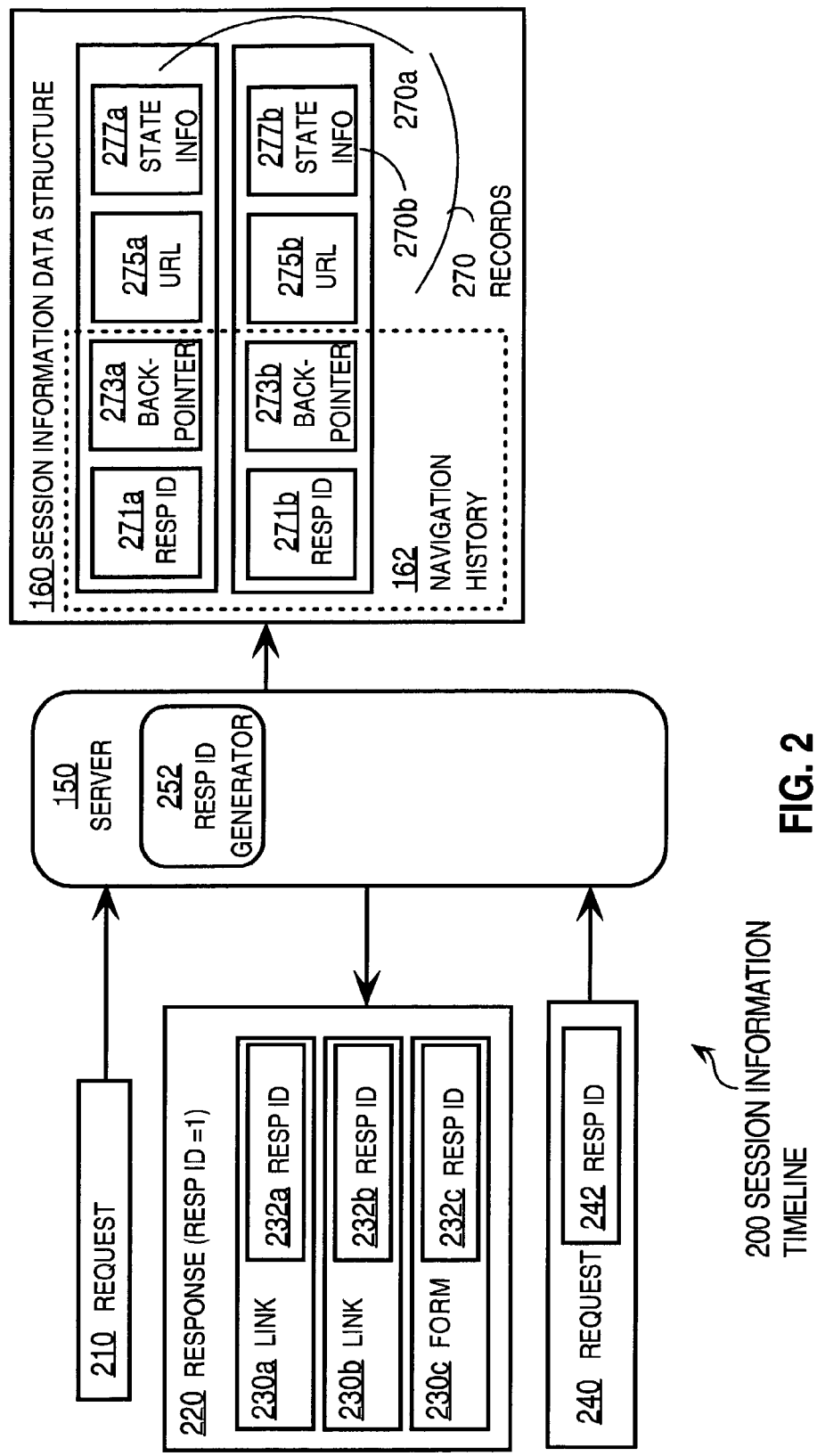
FIG. 2 is a time line diagram that illustrates generation of navigation history in session information stored and used by a server, according to an embodiment of the system depicted in FIG. 1.

FIG. 2 is a time line diagram that illustrates generation of navigation history in session information stored and used by a server, according to an embodiment of the system depicted in FIG. 1. Actions at different times are indicated by arrows at different vertical positions in the diagram, with time increasing downward. Thus, a request 210 is sent to server at one time, the server writes information to the session information data structure 160 later, and then sends response 220; subsequently, another request 240 is sent to the server.

During a session between a client and a server 150 of the network management application one or more requests, e.g., request 210, 240, are received by the server 150 from the client; and one or more responses, e.g., response 220, are prepared by the server 150 and sent to the client. Each response may include one or more linking items that cause additional requests to be sent to the server 150 when activated by a user of the client. For example, response 220 is a web page that includes link 230a, link 230b and form 230c (collectively called hereinafter "linking items" 230). Any linking item may be used. In some embodiments, linking items include instructions, such as a Java applet, that the browser executes on the browser's host.

The server 150 employs a RID generator 252 to generate a unique RID for each response sent during the session. Although RID generator 252 is shown in FIG. 2 within server 150, in other embodiments, the RID generator may reside outside the server 150 as a separate process on the same host or a different host of the application hosts. For example, when the application is made up of several servers on one or more hosts that all may serve the same client during a session, then the RID generator is a separate process that may be invoked by each server.

2.1 Session Information Data Structure

Information about the session is stored by server 150 in a session information data structure 160. In the illustrated embodiment, the session information data structure includes multiple data items called records 270, one record for each response generated for a request during the session. Each record 270 includes an RID field for storing the RID generated by the RID generator 252 for the response. For example, records 270a, 270b include fields 271a, 275b, respectively (collectively termed hereinafter "RID field" 271), for storing the RIDs for the two responses corresponding to the two records.

Each record 270 also includes a back-pointer field for storing the RID of the response that contained the linking item used to produce the request. For example, records 270a, 270b include fields 273a, 273b, respectively (collectively termed hereinafter "back-pointer RID field" 273), for storing the RIDs for the two responses that contained the linking items selected by a user of the client to produce the corresponding requests. The RID fields 271 and back-pointer RID fields 273 together constitute a linked list that provides the navigation history 162 stored in the session information data structure 160. Although a linked list of RIDs is shown in FIG. 2 as included within records of state information for the session, in other embodiments, the linked list may be stored in a separate data structure.

In the illustrated embodiment, each record 270 also includes a resource identification field for storing a resource identifier of the requested resource. For example, records 270a, 270b include fields 275a, 275b, respectively (collectively called hereinafter the "URL field" 275), for storing the URLs of the resources included in the responses. Note that two requests for the same resource have the same value in the URL fields 275 but have different values in the RID fields 271.

In the illustrated embodiment, each record 270 also includes one or more fields with state information for storing data about the request or dynamic response that is of use to the application during the session. For example, records 270a, 270b include fields 277a, 277b, respectively (collectively termed hereinafter "state information field" 277), for storing the information about the request or dynamic response during the session.

For purposes of illustration, it is assumed that, in response to receiving a request 210 for a "Home" page at URL "NetworkManagementService.Provider.com/Home.html," the RID generator 252 generates a unique RID value "1" for the next response in the session. The server then generates and stores a record 270a with: a value of "1" in the RID field 271a; a null value in the back-pointer field 273a, indicating no prior response during the current session was the source of the request; the value "NetworkManagementService.Provider.com/Home.html," in URL field 275a; and some state information in the state information field 277a.

2.2 Linking Items in a Response

According to the illustrated embodiment, one or more of the linking items 230 includes data that indicates an RID of the response that causes the client to produce the next request. For example, linking items 230a, 230b, 230c include fields 232a, 232b, 232c, respectively (collectively called hereinafter "source RID field" 232), that include values of RIDs that are considered the sources of the requests generated by selecting the corresponding linking elements.

It is assumed, for purposes of illustration, that response 220 has a value of "1" for its RID as indicated by the expression "(RESP ID=1)" in FIG. 2. It is further assumed that a request generated in response to a user of the client selecting form 230c is considered to have the response with RID-1 as its source. Source RID field 232c in this case holds a value of "1," the value of the RID for the response 220. In some embodiments, all source RID fields 232 in a response hold the value of the RID for the response. In some embodiments, described in more detail in later sections directed to backward navigation and parallel navigation, one or more source RID fields 232 holds a value of an RID for another response.

The source RID fields are placed in the linking items of the response so that the value in the source RID field of a particular linking item is included in the request generated when a user selects the particular linking item. In the illustrated embodiment, the source RID field is positioned within the extended URL field for URL encoding. In other embodiments, the source RID field is included in a hidden form field that is sent back to the server upon form submission.

2.3 Subsequent Requests

A subsequent request directed to the server 150 includes a value of the source RID associated with the linking item that was selected to generate the request. For example, request 240, generated by selecting one of the linking items 230 in response 220, includes source RID field 242 that holds a value of the RID included in the source RID field 232 in the selected linking item 230. It is assumed, for purposes of illustration, that the user selects form 230c that includes source RID field 232c that holds a value of "1." Then, the source RID field 242 in request 240 also holds the value "1" obtained from the source RID field 232c of form 230c.

The value received by the server 150 in the source RID field 242 is stored in the back-pointer field 273 of the record 270 generated for the response to request 240. As a result, the navigation history 162 associates the next response, and its state information in fields 275b, 277b, with the first response, and its state information in fields 275a, 277a.

For purposes of illustration, it is assumed that, by selecting form 230c, the user is prompted to enter some data and activate a "submit form" area of the form. When the user activates the submit form area, the browser sends a request 240 to the server for the URL "NetworkManagementService.Provider.com/FormFeedback." The request 240 includes data entered into the form and the source RID field 242 that holds a value of "1." In response to receiving the request 240, the RID generator 252 generates a unique RID value "2" for the next response in the session. The server then generates and stores a record 270b with: a value of "2" in the RID field 271b; a value of "1" in the back-pointer field 273b from the source RID field 242; the value "NetworkManagementService.Provider.com/FormFeedback," in URL field 275b; and some state information in the state information field 277b. As a result, the navigation history 162 associates state information generated for the FormFeedback response in fields 275b, 277b with the state information associated with the Home page response in fields 275a, 277a. In this way the state information is associated with the navigational history of the client.

Figure 3A:
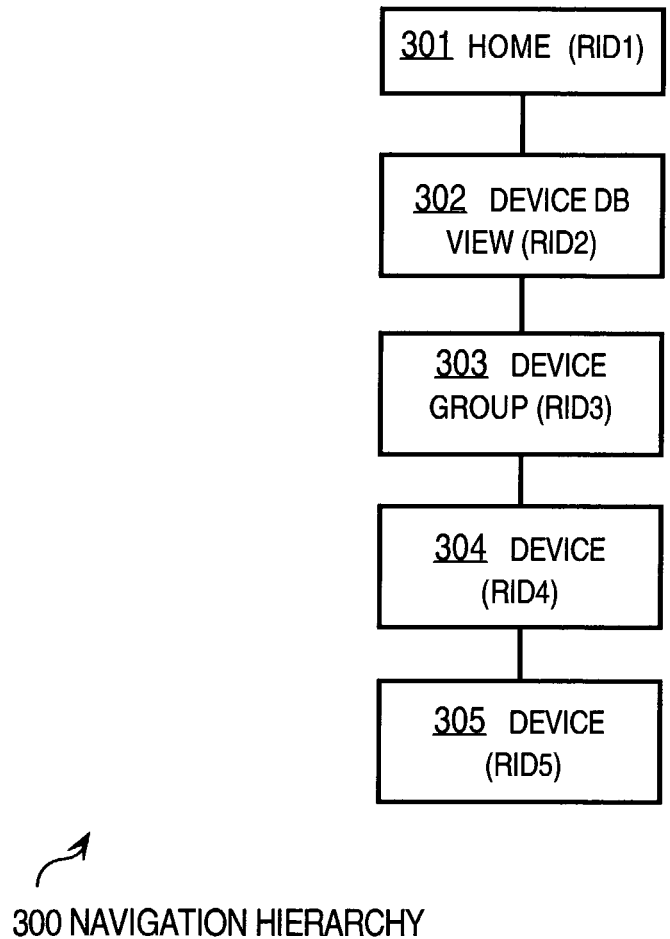
FIG. 3A is a block diagram that illustrates a first example navigation history hierarchy for a user of a browser through a network management application provided by one or more servers.

3.0 Method for Tracking Client Navigation Among Multiple Resources in Session Information Saved by a Server FIG. 3A is a block diagram that illustrates an example navigation history hierarchy for a user of a browser through a network management application provided by one or more servers. At a first time t1, a user of the browser requests the home page for the network management application.

At a second time t2 after t1, the user selects a link on the home page that requests a page that provides a view of a device database ("device DB") maintained by the network management application. The request includes the source RID value "RID1." The server generates response 302, which includes the device database page with an RID having the value "RID2."

At a third time t3 after t2, the user selects a link on the device database page that requests a device group page that lists devices in a particular device group maintained in the device DB by the network management application. The user receives response 303 generated by the server; the response includes the device group page with an RID having the value "RID3." At a fourth time t4 after t3, the user selects a link on the device group page that requests a page of information about a first device in the particular device group. The user receives response 304, which includes the device page for the first device with an RID having the value "RID4."

At a fifth time t5 after t4, the user selects a link on the first device page that requests a page of information about a second device in the particular device group. The user receives response 305, which includes the device page for the second device with an RID having the value "RID5."

Although both responses 304, 305 include information from the same type of page, a Device page, the responses have different RID values of RID4 and RID5, respectively. The state information is different for the two visits to the same page. In the first visit, the request and the response include values that relate to the first device, while in the second visit the request and response include values that relate to a different second device. This differs from conventional systems that have the same page ID for the same type of pages, e.g., for the Device page. Table 1 lists example navigation history and session information stored in the session information data structure for the navigation history depicted in FIG. 3A.

TABLE 1

Example Values in Session Information Data Structure for Navigation History of FIG. 3A.

| RID | Back-pointer | URL | State Info |
| --- | --- | --- | --- |
| RID1 | null | URL of Home Page | Time of request |
| RID2 | RID1 | URL of Device Database View Page | Time of request, network data |
| RID3 | RID2 | URL of Device Group Page | Time of request, group name |
| RID4 | RID3 | URL of Device Page | Time of request, first device identifier |
| RID5 | RID4 | URL of Device Page | Time of request, second device identifier |

The session information includes not only state information, but also navigation history information, which explicitly distinguishes between two visits to the same web page. Using this technique, the second visit to the Device Page with RID of "RID5" does not over-write the state information stored for the first visit with an RID value of "RID4." Furthermore, the back-pointer field 273 in the session information data structure 160 indicates the first visit was launched from the Device Group page, having RID value "RID3," while the second visit was launched from the first visit, having RID value "RID4." This changes the context of the visit to the Device page and therefore allows the application to perform differently in the second visit, in circumstances where a different response may be desired. For example, the state information, e.g., device status, may be different between visits. Although the pages have the same URL, they may convey different information, depending upon the state of dynamic resources.

The information stored in the session information data structure may be used in any manner. For example, the Device page may include information about the device along with information about other devices in the group similar to the devices already visited. Because of the navigation history, the application can determine the group information and the devices of the group that the client has already visited without passing all this information in the requests via URL-encoding and cookies.

Figure 4A:
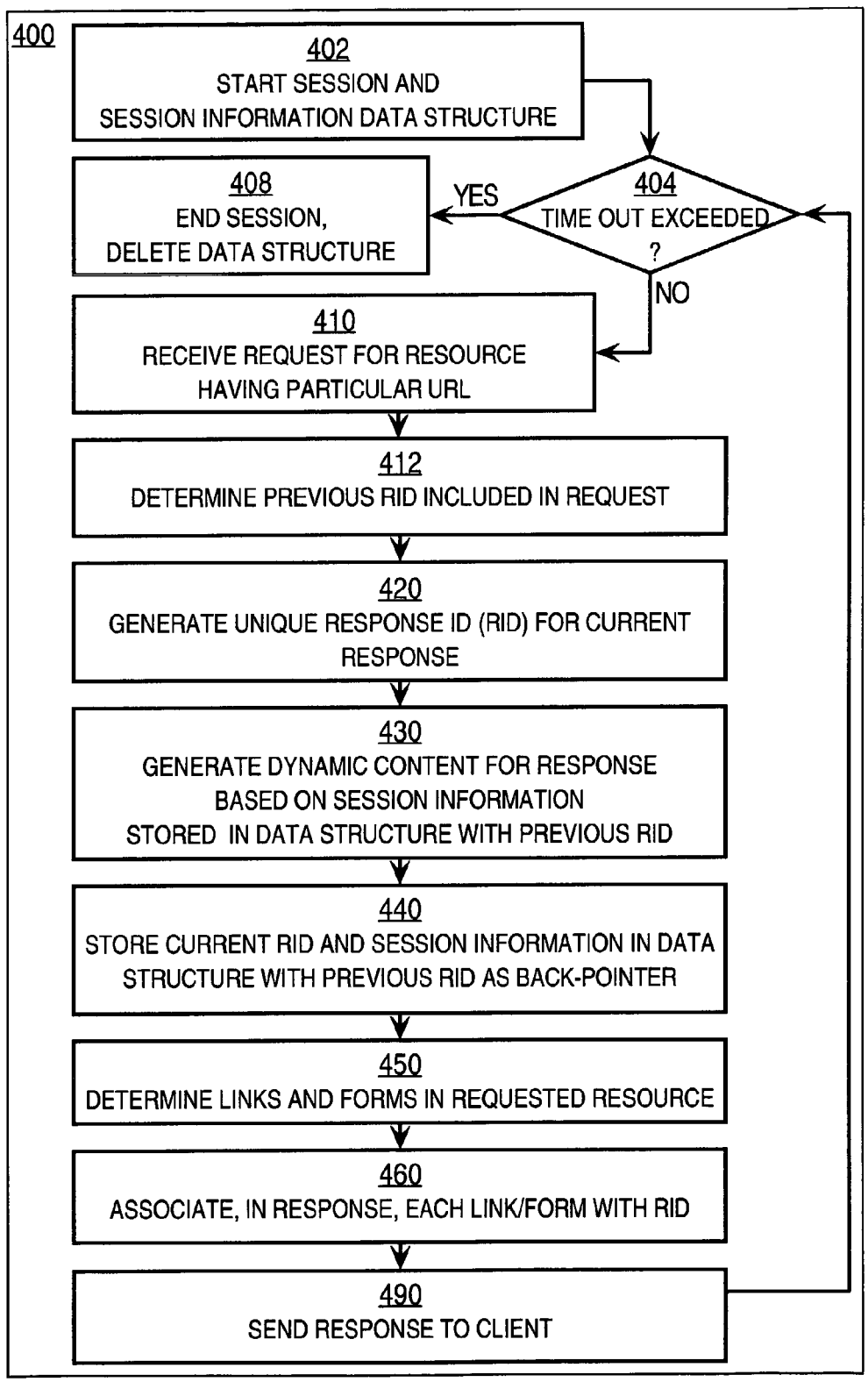
FIG. 4A is a flow diagram that illustrates a high level overview of one embodiment of a method for tracking client navigation among multiple resources in session information saved by a server.

FIG. 4A is a flow diagram that illustrates a high level overview of an embodiment 400 of a method for tracking client navigation among multiple resources in session information saved by a server.

In step 402, the session is started and the session information data structure is initiated. In step 404, a test is performed to determine whether the elapsed time waiting for the next request has exceeded a time-out duration. If so, then control passes to step 408 to end the session and delete the session information data structure. In some embodiments, step 408 includes storing permanently some or all of the session information; for example, to use in an analysis of how the application is performing for users.

If a request is received before the elapsed time exceeds the time-out, then control passes to step 410 to receive the request for a resource having a particular URL. For example, a request for the Home Page is received. In some embodiments, other mechanisms are employed to determine when a session ends; and step 404 is omitted or replaced by the other mechanism for determining when a session ends.

In step 412, any source RID included in the request is determined. The source RID is the RID of any response sent to the client before the response to be generated for the present request. For example, the request for the Home page, like the initial request 210 depicted in FIG. 2, does not include a source RID. The subsequent request for the Device DB View Page, such as request 240 depicted in FIG. 2, includes the value "RID1" in source RID field 242. Any mechanism may be employed to determine the source RID in the request. In one embodiment a servlet process, called herein a "controller servlet," is associated with the server 150. The controller servlet filters all incoming requests and handles the RID processing.

In step 420, the server generates, for the next response to the current request, a RID that is unique among all the responses sent during the current session. Any manner known in the art for generating the unique RID may be used. In one embodiment, a singleton class formed during step 402, when the session was started, is used to track the RIDs already assigned. A singleton class is a Java language class for which there is guaranteed to be only one object instance. A definition of a singleton in the form of a design pattern is provided in E. Gamma et al., "Design Patterns: Elements of Reusable Object-Oriented Software" (Reading, Mass.: Addison-Wesley, 1995).

In the illustrated embodiment, the singleton class has an attribute that stores the last RID assigned. The last RID assigned attribute is initiated with a value, such as the value "1." During step 420, the value stored in the last RID assigned is incremented by one, and the incremented value is used as the current RID and is stored as the updated last RID assigned. The singleton class may be invoked by any server of multiple servers that provide the application during the session.

In step 430, dynamic content for the response, if any, is generated. Dynamic content is determined in response to receiving a request based on information in the request, or in the state information associated with the session, or both. For example, the content displayed on the Device Page includes a list of other similar devices that are in the same group, if a group has been defined. This content depends on state information stored in the session information data structure.

In step 440 a record is stored in the session information data structure. The record associates the current RID and the source RID, if any, determined in step 412. The set of records forms a linked list. In the illustrated embodiment, the current RID and source RID are stored in the same record that stores the page ID (such as the URL) and the other state information. In some embodiments, the record includes only the current RID and the source RID. Other records or other data structures store an association between the current RID and the state information. In some embodiments, the state information includes a page identifier for the page requested, such as the URL of the requested page. For example, the information listed in one row of Table 1 is stored in a record.

In step 450, the linking items in the requested resource are determined. For example, the links and forms in the requested page to associate with a source RID are determined. In an embodiment, the web page links and forms and applets that are to be associated with a source RID include a special tag that includes the characters "nav:". For example, a link anchored in a web page by the well-known "<A>" tag is replaced by a tag "<nav:A>" that indicates a source RID is to be included in the URL for the link. Similarly, the well-known "<IMG>" tag is replaced by a tag "<nav:IMG>" that indicates a source RID is to be included in the URL for the image file.

In step 460, each linking element to be associated with a source RID is associated with a source RID. In some embodiments, a JavaServer Page (JSP) is employed to determine the correct source RID for each linking item with the "nav:" tag, and to insert that RID in the source RID field 232 of the extended URL for URL-encoding. In other embodiments, the correct source RID is inserted in information to be stored in a cookie, or some other mechanism for storing limited amounts of state information. The correct source RID is based on the kind of navigation, as described in more detail in the following subsections. For simple, forward navigation, the correct source RID is the RID for the current response.

In step 490, the response is sent to the client with one or more linking items associated with source RIDs. For example, response 302 is sent with one or more links and forms including URLs with a source RID field 232 set to the current RID, "RID2."

3.1 Process of Tracking Forward Navigation

For simple forward navigation, as depicted in FIG. 3A, the correct source RID associated with linking items during step 460 is the RID of the current response.

3.2 Process of Tracking Forward Navigation in Multiple Windows

Figure 3B:
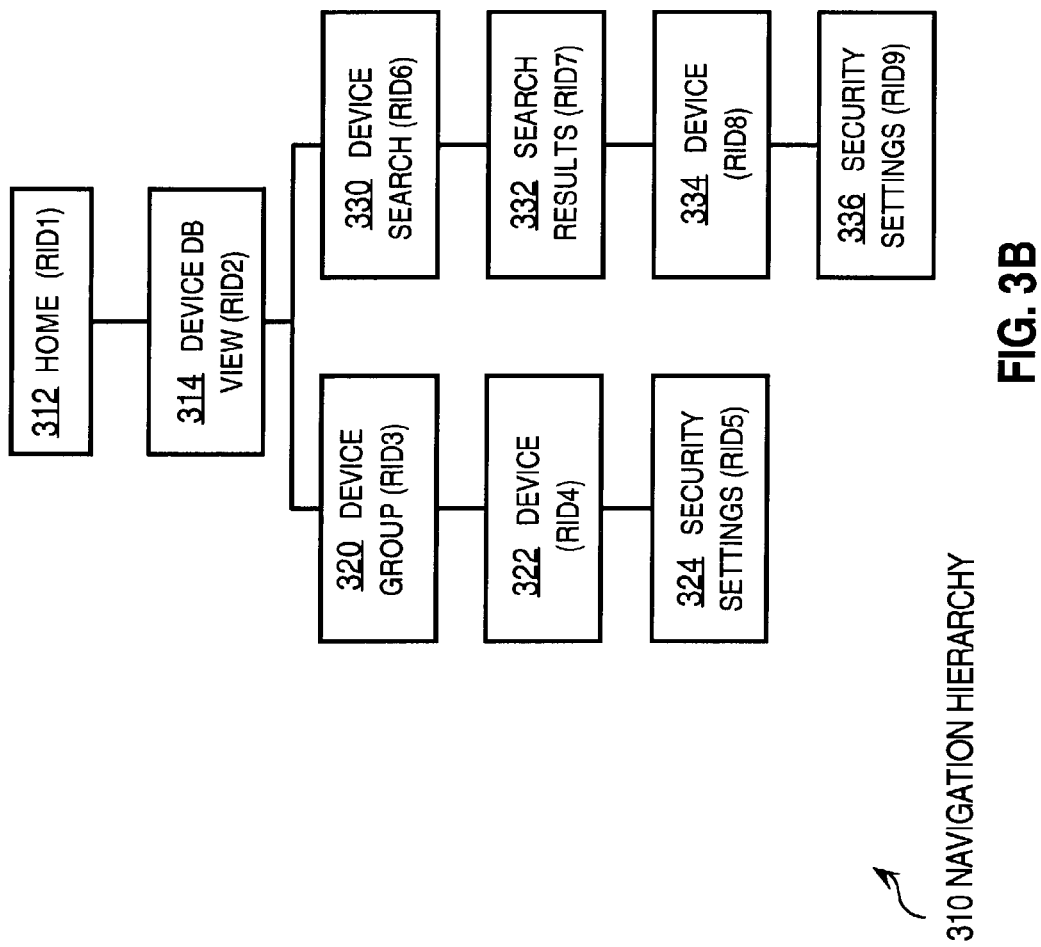
FIG. 3B is a block diagram that illustrates a second example navigation history hierarchy for a user of a browser through a network management application provided by one or more servers, at one point in time.

For forward navigation in multiple windows, as depicted in FIG. 3B, the correct source RID associated with linking items during step 460 is also the RID of the current response.

FIG. 3B is a block diagram that illustrates a second example navigation history hierarchy 310 for a user of a browser through a network management application provided by one or more servers, employing multiple windows, at one point in time.

At a first time t1, a user of the browser requests the Home page for the network management application. The request does not include a source RID. The server generates response 301, which includes the home page with an RID having the value "RID1." The linking items 230 on the home page have a URL encoded with a source RID field 232 holding the value "RID1." The server stores a record associated with RID1 in the session information data structure 160, as shown by the first row in Table 2; the record includes a null in the back-pointer field.

TABLE 2

Example Values in Session Information Data Structure for Navigation History of FIG. 3B.

| RID | Back-pointer | URL | State Info |
|---|---|---|---|
| RID1 | null | URL of Home Page | Time of request, client address |
| RID2 | RID1 | URL of Device Database View Page | Time of request, network data |
| RID3 | RID2 | URL of Device Group Page | Time of request, group name |
| RID4 | RID3 | URL of Device Page | Time of request, first device identifier |
| RID5 | RID4 | URL of Security Settings | Time of request, security settings for first device |
| RID6 | RID2 | URL of Device Search Page | Time of Request |
| RID7 | RID6 | URL of Search Results | Time of Request, search criteria, search results |
| RID8 | RID7 | URL of Device Page | Time of request, second device identifier |
| RID9 | RID8 | URL of Security Settings | Time of request, security settings for second device |

At a second time t2 after t1, the user selects a link on the home page URL-encoded with source RID value "RID1." The selection causes the browser to request a Device DB View page from the server 150. The server 150 sends response 314, which includes the Device DB View page with an RID having the value "RID2." The linking items 230 on the Device DB View page have a URL encoded with a source RID field 232 holding the value "RID2." The server stores a record associated with RID2 in the session information data structure, as shown by the second row in Table 2. The record includes the source RID value "RID1" in the back-pointer RID field 273.

At a third time t3 after time t2, the user selects a link for display in a new window. The link is URL-encoded with source RID value "RID2." For example, the user selects a link for a Device Group page for a particular group of devices in a manner that causes the browser to request a Device Group page for a particular group and to display the response in a new window. For example, in Microsoft's Internet Explorer, the user "right-clicks" on the link and then selects the "Open in New Window" option from the menu. The server sends response 320, which includes the Device Group page with an RID having the value "RID3." The linking items 230 on the Device Group page have a URL encoded with a source RID field 232 holding the value "RID3." The server stores a record associated with RID3 in the session information data structure, as shown by the third row in Table 2. The record includes the source RID value "RID2," in the back-pointer RID field 273.

The Device Group page is displayed in a second window. In other examples, the Device Group page sent by the server includes data indicating that the page should be displayed in a new window.

At a fourth time t4 after t3, the user selects a link on the Device Group page URL-encoded with source RID value "RID3." The selection causes the browser to request a Device page for displaying a particular device in the second window. The server sends response 322, which includes the Device page with an RID having the value "RID4." The linking items 230 on the Device page have a URL encoded with a source RID field 232 holding the value "RID4." The server stores a record associated with RID4 in the session information data structure as shown by the fourth row in Table 2. The record includes the source RID value "RID3," in the back-pointer RID field 273.

At a fifth time t5 after t4, the user selects a link on the Device page URL-encoded with source RID value "RID4." The selection causes the browser to request a Security Settings page for displaying a particular device in the second window. The server sends response 324, which includes the Security Settings page with an RID having the value "RID5." The linking items 230 on the Security Settings page have a URL encoded with a source RID field 232 holding the value "RID5." The server stores a record associated with RID5 in the session information data structure, as shown by the fifth row in Table 2. The record includes the source RID value "RID4," in the back-pointer RID field 273. The user can thus determine the security configuration setting for the first network device.

At a sixth time t6 after time t5, the user returns to the original window, for example, by placing a pointing device over a portion of the original window exposed outside the second window and clicking a button on the pointing device. The browser presents the Device DB View page having RID2 and many links and forms URL-encoded with source RID value "RID2," as described above. The user selects a link on the Device DB View page URL-encoded with source RID value "RID2." The selection causes the browser to request a Device Search page for determining network devices that satisfy search criteria input by the user in a form. The server sends response 330, which includes the Device Search page with an RID having the value "RID6." The linking items 230 on the Device Search page have a URL encoded with a source RID field 232 holding the value "RID6." The server stores a record associated with RID6 in the session information data structure, as shown by the sixth row in Table 2. The record includes the source RID value "RID2," in the back-pointer field.

Thus both response 330 having RID value "RID3" and response 320 having RID value "RID6" show that they were launched from a link in response 314 having RID value "RID2." This is depicted in the navigation history hierarchy of FIG. 3B as two child responses from response 314. Therefore the method is robust in the presence of multiple windows of a browser.

At a seventh time t7 after t6, the user submits a form of search criteria on the Device Search page; the form includes the source RID value "RID4" in the request sent to the server, using either the well known GET or POST methods. The server generates and sends response 332, which includes the Search Results page with an RID having the value "RID7." The linking items 230 on the Search Results page have a URL encoded with a source RID field 232 holding the value "RID7." The server stores a record associated with RID7 in the session information data structure, as shown by the seventh row in Table 2. The record includes the source RID value "RID6," in the back-pointer field. The Search Results page is displayed by the browser in the first window.

At an eighth time t8 after t7, the user selects a link on the Search Results page URL-encoded with source RID value "RID7." The selection causes the browser to request a Device page for displaying a second device, different than the particular device selected from the Device Group page in response 320. The server sends response 334, which includes the Device page with an RID having the value "RID8." The linking items 230 on the Device page have a URL encoded with a source RID field 232 holding the value "RID8." The server stores a record associated with RID8 in the session information data structure as shown by the eighth row in Table 2. The record includes the source RID value "RID7," in the back-pointer RID field 273.

The session information data structure 160 thus distinguishes the second visit to the Device page associated with "RID8" from an earlier visit to the Device Page associated with "RID4." The contexts are different, as given by the back-pointer fields 273 in the fourth and eighth rows of Table 2; and the application is able to exploit this difference in context when presenting information on the two instances of the Device Page.

At a ninth time t9 after t8, the user selects a link on the Device page URL-encoded with source RID value "RID8." The selection causes the browser to request a Security Settings page for displaying a particular device in the second window. The server sends response 336, which includes the Security Settings page with an RID having the value "RID9." The linking items 230 on the Security Settings page have a URL encoded with a source RID field 232 holding the value "RID9." The server stores a record associated with RID9 in the session information data structure, as shown by the ninth row in Table 2. The record includes the source RID value from the request, "RID8," in the back-pointer RID field 273. The user can thus determine the security configuration setting for the second network device. The user may change the security settings in the Security Settings page using one or more forms on the page.

The session information stored in the session information data structure allows the user to compare and copy settings from one instance of the Security Settings page (either of responses 324 and 336) to the other. One instance of the Security Settings page (from response 336) is displayed in the first window of the browser, and the other (from response 324) is displayed in the second window of the browser. The two instances are distinguished in the session information data structure 160 as shown above by the fifth and ninth rows of Table 2.

Therefore, embodiment 400 produces the navigational history hierarchy depicted in FIG. 3B for forward navigation and multiple window navigation. Using embodiment 400, client navigation among multiple web pages can be tracked. The tracking is robust in the presence of multiple windows, bandwidth limitations, and limitations in the sizes of URL fields and cookies.

3.3 Process of Tracking Backward Navigation

Figure 3C:
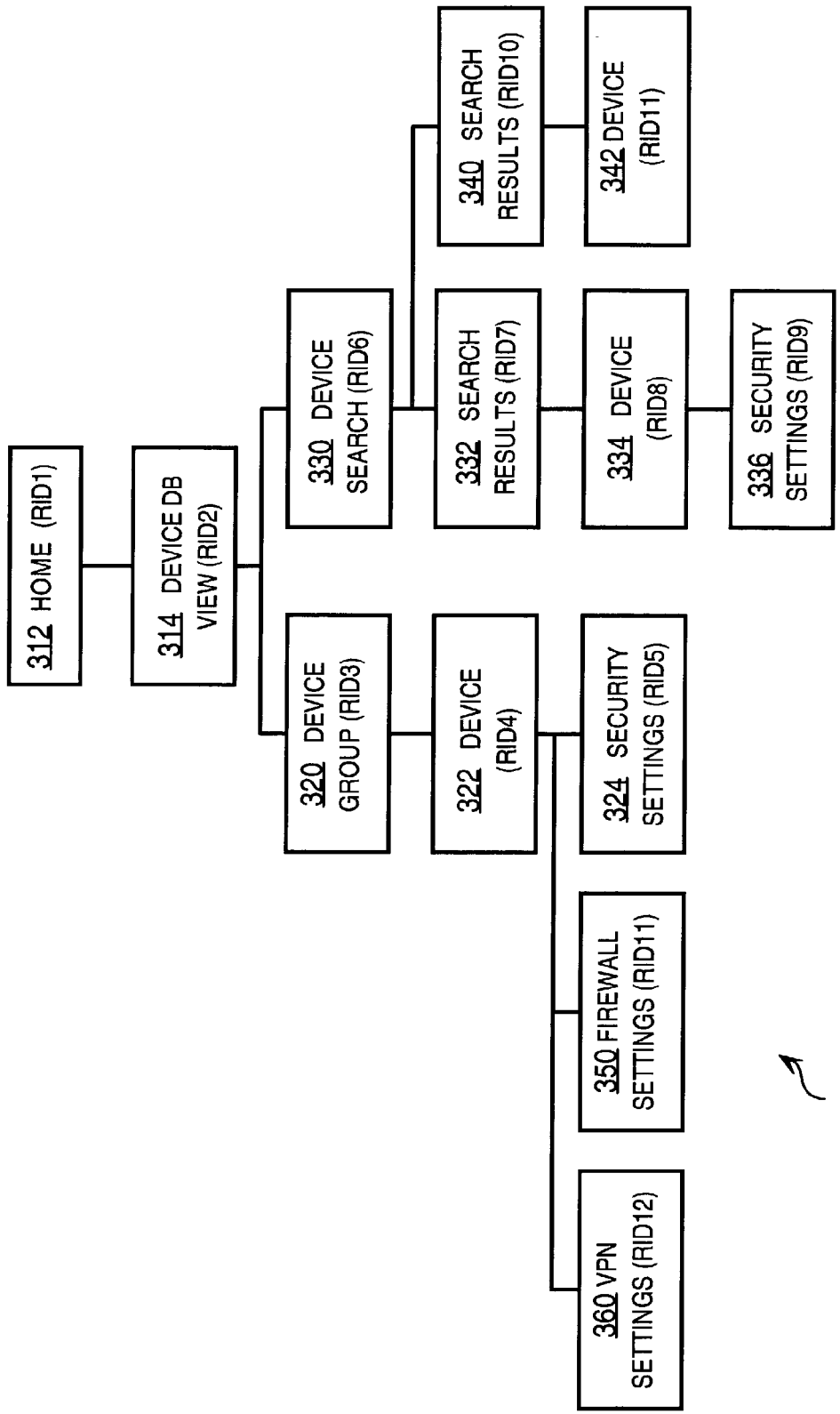
FIG. 3C is a block diagram that illustrates the second example navigation history hierarchy, at a time subsequent to the time depicted in FIG. 3B.

It is often possible for a client to navigate backwards and return to pages already visited. For example, the user may activate a "Back Button" area on the user's browser. This causes the user's browser to make another request of the URL formerly visited. Logically, the user expects the state information that existed prior to that first visit to be associated with the second visit. To respect this desire for prior state information, according to some embodiments, the page includes one or more backward linking items and the source RID associated with the backward linking item is different than the RID of the current page. FIG. 3C illustrates backward navigation.

FIG. 3C is a block diagram that illustrates the second example navigation history hierarchy, at a time subsequent to the time depicted in FIG. 3B. As depicted in FIG. 3C, at a tenth time t10, after t9, the user has decided to go backward in the first window to the Search Results page to view another device that satisfies the search criteria. Logically, this may be represented as a second response 340 that includes the Search Results page and that has RID value "RID10." The search criteria are the same as presented in the form of the Device Search page sent in response 330, so, logically, the new instance of the search results page should point back to the response 330 that includes the Device Search Page and that has RID value "RID6." This is shown in the navigation history hierarchy of FIG. 3C as two child responses 332, 340 having RID values "RID7," "RID10," respectively from parent response 330 having RID value "RID6."

To achieve this logically desirable hierarchy in the session information data structure, a linking item that is associated with backward navigation to a former response with a particular RID should include in its source RID the value stored in the back-pointer field of the record associated with the particular RID. For example, a linking item for backward navigation to a new instance of response RID7 (which will have a new RID value "RID10") should be URL-encoded with the back-pointer of former response RID7. From Table 2, it can be seen that the back-pointer for the response with RID value "RID7" is "RID6." Therefore a linking item for backward navigation to the new instance of the Search Results page should have a source RID value "RID6."

Figure 3D:
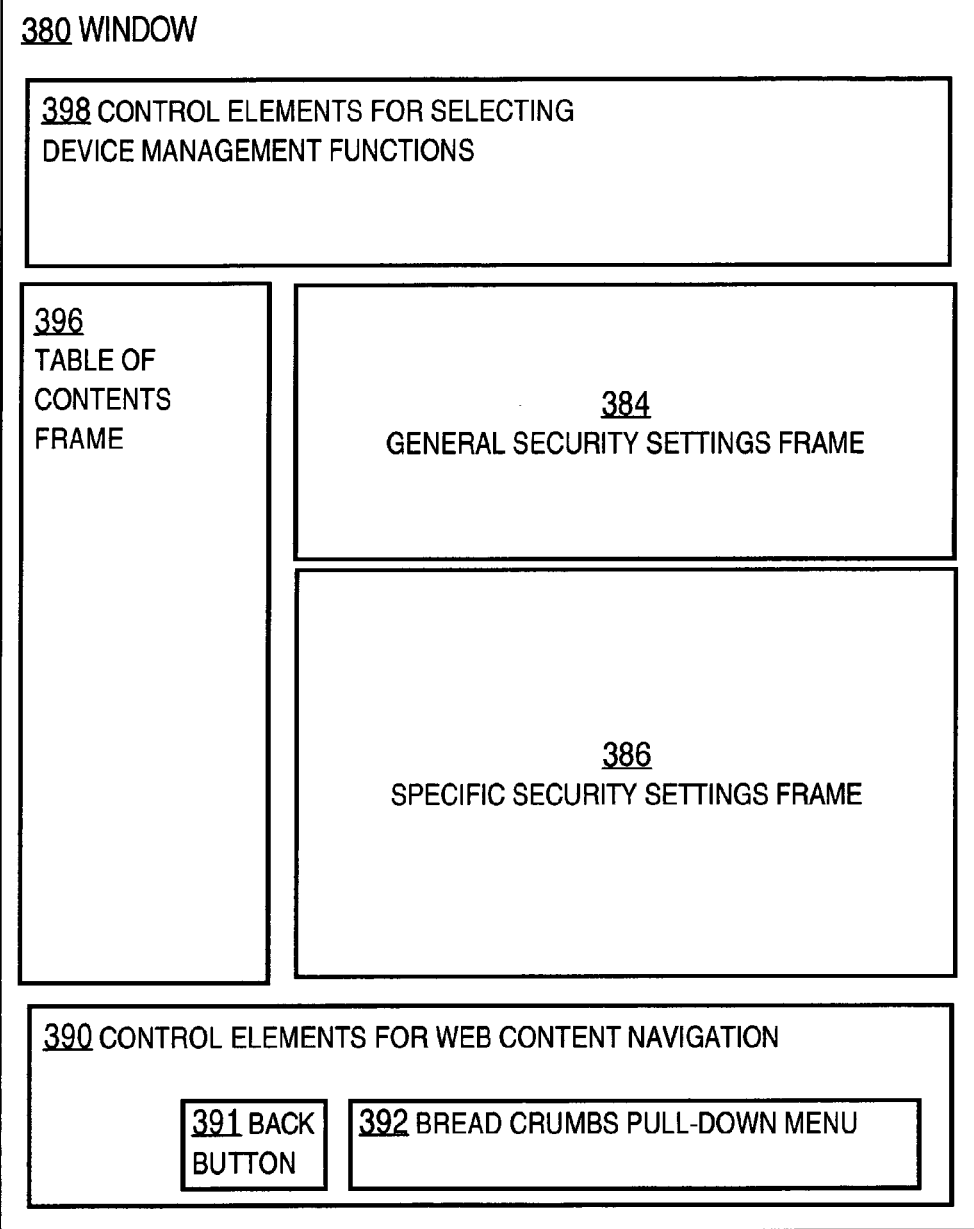
FIG. 3D is a block diagram of an example of multiple web pages presented as multiple frames in a window by a browser.

FIG. 3D is a block diagram of an example of multiple web pages presented as multiple frames in a window 380 by a browser. For purposes of illustration it is assumed that window 380 is the first window as a result of response 336 that includes the Security Settings page before backward navigation, and is associated with RID value "RID9."

The window 380 includes frames 384, 386, 390, 396, 398. Frame 384 displays information about general security settings and includes control elements to change one or more values of the security settings. Frame 386 displays information about security settings specific for a certain selected function, such as a firewall function and a virtual private network function. Frame 386 may be blank when no specific security function has been selected. Frame 390 displays controls for backward navigation, described in more detail below. Frame 396 displays a table of contents for selecting one of several specific security functions. Frame 398 displays high level network management functions, and includes control elements for logging in to the application, for selecting one or more other network management functions, and for exiting the application.

Frame 390 displays controls for backward navigation, such as a back button 391 and a pull-down menu 392 for listing the breadcrumbs of responses already generated during the current session in the current window. As described above, window 380 is associated with RID value "RID9." Most of the links in frames 384, 386 each include a source RID field with a value of "RID9."

According to the illustrated embodiments, the source RID fields included in linking items of frame 390 do not each include a value of "RID9" but, instead include a different value. For example, back button 391, which indicates a return to response 334 having RID value of "RID8," causes a request for the URL for the Device Page and has a URL-encoded source RID field that holds a value of "RID7." The value "RID7" is obtained from the back-pointer field 273 of the record 270 associated with "RID8," as shown in the eighth row of Table 2.

A link in the breadcrumbs pull-down menu 392 may refer to any previous response. For example, a Search Results link in pull-down menu 392 refers to previous response 332 having an RID value of "RID7." From the seventh row of Table 2, it can be seen that the back-pointer field 273 of the record 270 associated with "RID7" is "RID6." Therefore the Search Results link in pull-down menu 392 was generated by the server to include a source RID field 232 holding a value of "RID6." When a user selects this Search Results link, a request for the URL of the Search Results page is sent with a source RID of "RID6;" as desired to produce the navigation history hierarchy depicted in FIG. 3C.

In response to the request for the Search Results page with source RID value "RID6," the server generates another instance of the Search Results page with RID value "RID10." The information on the results page can be generated based at least in part on the information in the session information data structure in the record 270 associated with "RID7" that was also derived from source RID having a value "RID6." The server sends response 340, which includes the Search Results page with an RID having the value "RID10."

Many of the linking items 230 on the Search Results page have a URL encoded with a source RID field 232 holding the value "RID10." The server stores a record associated with "RID10" in the session information data structure, as shown by the first row in Table 3. The record includes the source RID, "RID6," in the back-pointer field. The Search Results page is displayed by the browser in the first window.

TABLE 3

Example Values in Session Information Data Structure for New Navigation History of FIG. 3C.

| RID | Back-pointer | URL | State Info |
|---|---|---|---|
| RID10 | RID6 | URL of Search Results | Time of Request, search criteria, search results |
| RID11 | RID10 | URL of Device Page | Time of request, third device identifier |
| RID12 | RID4 | URL of Firewall Settings | Time of request, firewall settings for first device |
| RID13 | RID4 | URL of Virtual Private Network (VPN) Settings | Time of request, VPN settings for first device |

At an eleventh time t11 after t10, the user selects a link on the Search Results page URL-encoded with source RID "RID10." The selection causes the browser to request a Device page for displaying a third device, different than the first and second devices selected from the Device Group page in response 320 and the Search Results page in response 332, respectively. The server sends response 342, which includes the Device page with an RID having the value "RID11." Many of the linking items 230 on the Device page have a URL encoded with a source RID field 232 holding the value "RID11." The server stores a record associated with "RID11" in the session information data structure as shown by the second row in Table 3. The record includes the source RID value "RID11," in the back-pointer RID field 273.

The session information data structure 160 thus distinguishes the third visit to the Device page associated with "RID11" from the earlier visits to the Device Page associated with "RID4" and "RID8." The contexts are different, as given by the back-pointer fields 273 in the fourth and eighth rows of Table 2 and the second row of Table 3; and the application is able to exploit this difference in context when presenting information on the three instances of the Device Page.

FIG. 4B is a flow diagram that illustrates an embodiment 460a for handling backward navigation of step 460 depicted in FIG. 4A.

In step 462, the next linking item in the response is determined. For example, the next linking item with the "nav:" tag is found.

In step 464, it is determined whether the linking item is associated with backwards navigation to a former response. For example, it is determined whether the linking item is back button 391 or a link in the breadcrumbs pull-down menu 392.

If the linking item is not associated with backwards navigation, then control passes to step 470. In step 470, it is determined whether the linking item is associated with parallel navigation with respect to the current response. Parallel navigation is described in more detail in the next section.

If the linking item is not associated with parallel navigation, then control passes to step 474. In step 474, the current RID is associated with the linking item. For example, if the current response has an RID value of "RID9" then the value "RID9" is URL-encoded in the source RID field 232 of the linking item. Control then passes to step 480.

In step 480, it is determined whether the last linking item has been reached in the current response. If not, control passes back to step 462 to determine the next linking item in the response. If so, control passes to step 490 depicted in FIG. 4A, to send the response to the client.

If it is determined in step 464 that the linking item is associated with backwards navigation to a former response, control passes to step 466. In step 466, the server associates with the linking item the back-pointer RID value in the record associated with the former response. For example, if the backward navigation linking item refers to the response having RID value "RID7," the back-pointer RID value "RID6" is URL-encoded in the source RID field 232 of the linking item. Control then passes to step 480, described above.

If it is determined in step 470 that the linking item is associated with parallel navigation, control passes to step 472. Step 472 is described in the next section.

3.4 Process of Tracking Parallel Navigation

It is often possible for a client to navigate to each of several logically parallel pages. For example, the user may visit several pages from a table of contents frame. Logically, the user expects the state information to be the same for the several pages. To respect this desire for parallel pages, according to some embodiments, the page includes one or more parallel navigation linking items and the source RID associated with the parallel linking item is different than the RID of the current page.

FIG. 3C also illustrates parallel navigation. As depicted in FIG. 3C, at a twelfth time t12, after t11, the user has returned to the second window and decided to view security settings for several specific security functions. Logically, this may be represented as two additional responses 350, 360 that have RID values "RID12," "RID13," respectively. The device is the same as presented in the Device page sent in response 322, so, logically, the new responses could point back to the response 322 that has RID value "RID4." This is shown in the navigation history hierarchy of FIG. 3C as three parallel child responses 324, 350, 360 having RID values "RID5," "RID12," "RID13," respectively from parent response 322 having RID value "RID4."

To achieve this logically desirable hierarchy in the session information data structure, a linking item that is associated with parallel navigation with a current response that has a particular RID should include in its source RID field 232 the value stored in the back-pointer field 273 of the record associated with the particular RID. For example, a linking item for parallel navigation with current response RID5 should be URL-encoded with the back-pointer value of response "RID5." From Table 2, it can be seen that the back-pointer for the response with RID value "RID5" is "RID4." Therefore a linking item for parallel navigation with current response "RID5" should have a source RID of "RID4."

FIG. 3D is a block diagram of an example of multiple web pages presented as multiple frames in a window 380 by a browser. For purposes of illustration it is assumed hereinafter that window 380 is the second window as a result of response 324 that includes the general Security Settings page before parallel navigation, and is associated with RID value "RID5." The window 380 includes frames 384, 386, 390, 396 and 398, described above. Most of the links in frames 384 and 386 each include a source RID field with a value of "RID5."

Frame 396 displays a table of contents for selecting one of several specific security functions. The frame includes links to pages for each of the specific security functions. Activating each link places function specific security settings in frame 386. The specific security functions are considered to be parallel pages to the general Security Settings page. Thus frame 396 includes several parallel navigation linking elements.

According to the illustrated embodiments, the source RID fields 232 included in linking items of frame 396 do not each include a value of "RID5" but, instead include a different value. For example, a Firewall link to a Firewall Settings page causes a request for a URL for the Firewall Settings Page and has a URL-encoded source RID field that holds a value of "RID4." The value "RID4" is obtained from the back-pointer field 273 of the record 270 associated with "RID5," as shown in the fifth row of Table 2.

Similarly, a VPN link to a Virtual Private Network (VPN) Settings page causes a request for a URL for the VPN Settings Page and has a URL-encoded source RID field that holds a value of "RID4." The value "RID4" is obtained from the back-pointer field 273 of the record 270 associated with "RID5," as shown in the fifth row of Table 2. By having links to the Firewall Settings Page and the VPN Settings Page both report a URL-encoded source RID value "RID4," the desired navigation history hierarchy depicted in FIG. 3C is produced.

In response to the request for the Firewall Settings page with source RID value "RID4," the server generates response "RID12." The information on the results page can be generated based at least in part on the information in the session information data structure in the record 270 associated with "RID5" that was also derived from source RID having a value "RID4." The server sends response 350, which includes the Firewall Settings page with an RID having the value "RID12." Many of the linking items 230 on frame 386 have a URL encoded with a source RID field 232 holding the value "RID12." The linking items 230 on frame 396 have a URL encoded with a source RID field 232 holding the value "RID4." The server stores a record associated with "RID12" in the session information data structure, as shown by the third row in Table 3. The record includes the source RID, "RID4," in the back-pointer field.

Similarly, after presenting response 350 in the second window, in response to a request for the VPN Settings page with source RID value "RID4," the server generates response "RID13." The information on the results page can be generated based at least in part on the information in the session information data structure in the record 270 associated with "RID12" that was also derived from source RID having a value "RID4." The server sends response 360, which includes the VPN Settings page with an RID having the value "RID13." Many of the linking items 230 on frame 386 have a URL encoded with a source RID field 232 holding the value "RID12." The linking items 230 on frame 396 have a URL encoded with a source RID field 232 holding the value "RID4." The server stores a record associated with "RID13" in the session information data structure, as shown by the fourth row in Table 3. The record includes the source RID, "RID4," in the back-pointer field. Thus a desired navigation history hierarchy is achieved.

FIG. 4B also illustrates an embodiment 460*a* for handling parallel navigation of step 460 depicted in FIG. 4A. In step

470, it is determined whether the linking item is associated with parallel navigation with respect to the current response. For example, it is determined whether the linking item is in frame 396 that includes a table of contents for security settings for specific security functions.

If the linking item is associated with parallel navigation, then control passes to step 472. In step 472, the back-pointer RID of the current RID is associated with the linking item. For example, if the current response has an RID value of "RID5" then the value "RID4" is URL-encoded in the source RID field 232 of the linking item. Similarly, if the current response has an RID value of "RID12" then the value "RID4" is URL-encoded in the source RID field 232 of the linking item. Control then passes to step 480, described above.

As described above, embodiment 460a produces the navigational history hierarchy depicted in FIG. 3C for forward navigation, multiple window navigation, backward navigation and parallel navigation. Using embodiment 460a, client navigation among multiple web pages can be tracked. The tracking is robust in the presence of multiple windows, backward navigation, parallel navigation, bandwidth limitations, and limitations in the sizes of URL fields and cookies.

4.0 Implementation Mechanisms—Hardware Overview

Figure 5:
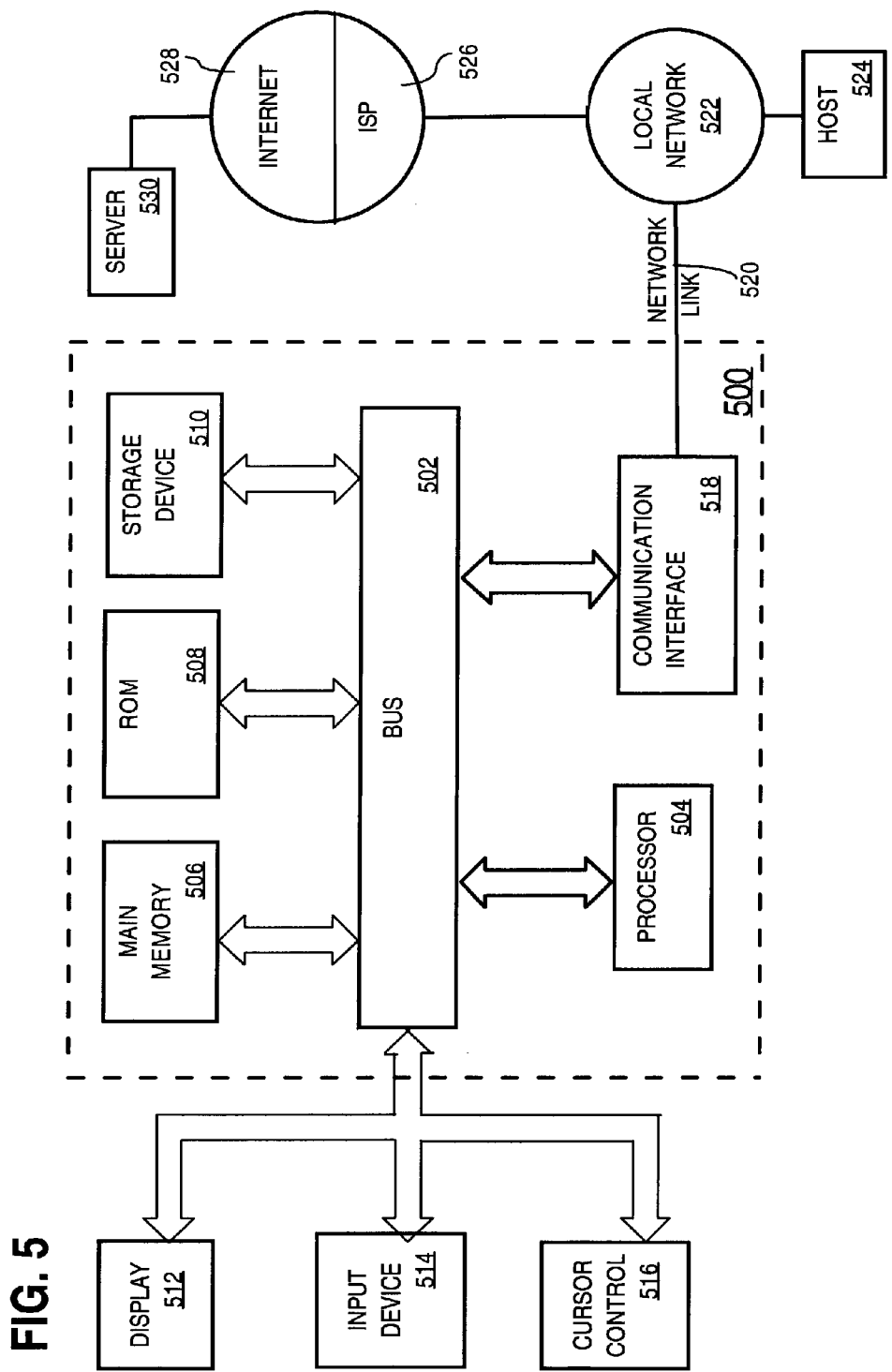
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for tracking client navigation among multiple resources in communication session information saved by a server. According to one embodiment of the invention, the tracking is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for tracking client navigation as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for one or more servers to track navigation by a client among a plurality of content components provided by the one or more servers, the method comprising the computer-implemented steps of:
receiving from the client, during a communication session with the one or more servers, a first request for a first content component of the plurality of content components;
in response to receiving the first request, generating a first response identification wherein the first response identification distinguishes among multiple visits by the client to the first content component, wherein the first response identification is in a plurality of response identifications each of which is generated by the one or more servers during the communication session in response to one request from the client, and wherein the plurality of response identifications and state information of the communication session are saved on the one or more servers;
storing, on the one or more servers, information associated with the first request in a first record of a data structure that identifies content components that have been selected by the client in the communication session, wherein the first record is associated with the first response identification;
determining a linking element in the first content component, wherein selection of the linking element causes the client to generate a second request for a second content component of the plurality of content components;
associating the first response identification with the linking element in a first response that contains the first content component such that the second request includes the first response identification; and
sending the first response to the client;
wherein successive responses sent to the client from the servers are tracked by the one or more servers using the state information of the communication session saved on the one or more servers and the plurality of response identifications saved on the one or more servers.

2. A method as recited in claim 1, said step of storing information associated with the first request in the first record further comprising the step of storing, in the first record, information from at least one of the first request and the first response.

3. A method as recited in claim 1, wherein the method further comprises generating dynamic content for the first content component in response to receiving the first request, and wherein the step of storing information associated with the first request in the first record further comprising the step of storing the dynamic content in the first record.

4. A method as recited in claim 1, wherein the client is a web browser, and wherein each of the one or more servers is a web server.

5. A method as recited in claim 4, wherein the plurality of content components is a plurality of web pages.

6. A method as recited in claim 4, wherein the plurality of content components is a plurality of web page frames.

7. A method as recited in claim 4, wherein the linking element is a hyperlink on a first web page for requesting a second web page.

8. A method as recited in claim 4, wherein the linking element is a form for receiving user input on a web page and sending the user input to one of the one or more servers.

9. A method as recited in claim 1, wherein the linking element includes a sequence of instructions that is executed by a processor on a host for the client and causes the processor to send a request to one of the one or more servers.

10. A method as recited in claim 1, further comprising the steps of:
in response to receiving the first request, determining whether the first request includes a response identification; and
in response to determining that the first request includes the response identification, during said step of storing information associated with the first request in the first record, storing the response identification in a back-pointer field associated with the first response identification.

11. A method as recited in claim 10, further comprising, based on a plurality of back-pointer fields associated with a corresponding plurality of response identifications, generating a hierarchy that represents navigation by the client among the plurality of content components.

12. A method as recited in claim 11, wherein the step of generating the hierarchy comprises indicating a branch point in the hierarchy at a content component from which the client activated a linking element that started a new instance of the client.

13. A method as recited in claim 11, wherein the step of generating the hierarchy comprises indicating a branch point in the hierarchy associated with a particular content component to which the client backwards linked from a previously requested content component.

14. A method as recited in claim 10, further comprising, in response to determining that the first request includes the response identification, performing the step of generating dynamic content for the first content component based at least in part on information stored in a record associated with the response identification in the data structure.

15. A method as recited in claim 10, the method further comprising the steps of:
determining a backward linking element in the first content component, wherein selection of the backward linking element causes the client to generate a request for a previously sent response, which response is indicated by information previously stored in a record of the data structure associated with another response identification;

retrieving a second other response identification stored in a back-pointer field associated with said another response identification; and associating the second other response identification with the backward linking element in the first response such that the request includes the second other response identification.

16. A method as recited in claim 15, wherein the previously sent response is a most recently sent response; and the other said another response identification is the same as said response identification.

17. A method as recited in claim 10, the method further comprising the steps of:

determining a parallel linking element in the first content component, wherein selection of the parallel linking element causes the client to generate a request for another response at the same level of a navigational hierarchy as the first response;

associating said response identification with the parallel linking element in the first response such that the other request includes said response identification.

18. A non-transitory computer-readable storage medium carrying one or more sequences of instructions for one or more servers to track navigation by a client among a plurality of content components provided by the one or more servers, which instructions, when executed by one or more processors, cause the one or more processors to carry out the steps of: receiving from the client, during a communication session with the one or more servers, a first request for a first content component of a plurality of content components;

in response to receiving the first request, generating a first response identification wherein the first response identification distinguishes among multiple visits by the client to the first content component, wherein the first response identification is in a plurality of response identifications each of which is generated by the one or more servers during the communication session in response to one request from the client, and wherein the plurality of response identifications and state information of the communication session are saved on the one or more servers;

storing, on the one or more servers, information associated with the first request in a first record of a data structure that identifies content components that have been selected by the client in the communication session, wherein the first record is associated with the first response identification;

determining a linking element in the first content component, wherein selection of the linking element causes the client to generate a second request for a second content component of the plurality of content components;

associating the first response identification with the linking element in a first response that contains the first content component such that the second request includes the first response identification; and sending the first response to the client;

wherein successive responses sent to the client from the servers are tracked by the one or more servers using the state information of the communication session saved on the one or more servers and the plurality of response identifications saved on the one or more servers.

19. An apparatus for one or more servers to track navigation by a client among a plurality of content components provided by the one or more servers, comprising:

a network interface that is coupled to a data network for receiving one or more packet flows therefrom;

a processor;

one or more stored sequences of instructions which, when executed by the processor, cause the processor to carry out the steps of:

receiving from the client, during a communication session with the one or more servers, a first request for a first content component of a plurality of content components;

in response to receiving the first request, generating a first response identification;

wherein the first response identification distinguishes among multiple visits by the client to the first content component, wherein the first response identification is in a plurality of response identifications each of which is generated by the one or more servers during the communication session in response to one request from the client, and wherein the plurality of response identifications and state information of the communication session are saved on the one or more servers;

storing, on the one or more servers, information associated with the first request in a first record of a data structure that identifies content components that have been selected by the client in the communication session, wherein the first record is associated with the first response identification;

determining a linking element in the first content component, wherein selection of the linking element causes the client to generate a second request for a second content component of the plurality of content components;

associating the first response identification with the linking element in a first response that contains the first content component such that the second request includes the first response identification; and sending the first response to the client;

wherein successive responses sent to the client from the servers are tracked by the one or more servers using the state information of the communication session saved on the one or more servers and the plurality of response identifications saved on the one or more servers.

20. An apparatus as recited in claim 19, further comprising one or more additional instructions which, when processed by the processor, cause storing, in the first record, information from at least one of the first request and the first response.

21. An apparatus as recited in claim 19, further comprising one or more additional instructions which, when processed by the processor, cause generating dynamic content for the first content component in response to receiving the first request, and wherein the step of storing information associated with the first request in the first record further comprising the step of storing the dynamic content in the first record.

22. An apparatus as recited in claim 19, wherein the client is a web browser, and wherein each of the one or more servers is a web server.

23. An apparatus as recited in claim 22, wherein the plurality of content components is a plurality of web pages.

24. An apparatus as recited in claim 22, wherein the plurality of content components is a plurality of web page frames.

25. An apparatus as recited in claim 22, wherein the linking element is a hyperlink on a first web page for requesting a second web page.

26. An apparatus as recited in claim 22, wherein the linking element is a form for receiving user input on a web page and sending the user input to one of the one or more servers.

27. An apparatus as recited in claim 19, wherein the linking element includes a sequence of instructions that is executed by a processor on a host for the client and causes the processor to send a request to one of the one or more servers.

28. An apparatus as recited in claim 19, further comprising one or more additional instructions which, when processed by the processor, cause:
    in response to receiving the first request, determining whether the first request includes a response identification; and
    in response to determining that the first request includes the response identification, during said step of storing information associated with the first request in the first record, storing the response identification in a back-pointer field associated with the first response identification.

29. An apparatus as recited in claim 28, further comprising one or more additional instructions which, when processed by the processor, cause, based on a plurality of back-pointer fields associated with a corresponding plurality of response identifications, generating a hierarchy that represents navigation by the client among the plurality of content components.

30. An apparatus as recited in claim 29, wherein the step of generating the hierarchy comprises indicating a branch point in the hierarchy at a content component from which the client activated a linking element that started a new instance of the client.

31. An apparatus as recited in claim 29, wherein the step of generating the hierarchy comprises indicating a branch point in the hierarchy associated with a particular content component to which the client backwards linked from a previously requested content component.

32. An apparatus as recited in claim 28, further comprising one or more additional instructions which, when processed by the processor, cause, in response to determining that the first request includes the response identification, performing the step of generating dynamic content for the first content component based at least in part on information stored in a record associated with the response identification in the data structure.

33. An apparatus as recited in claim 28, further comprising one or more additional instructions which, when processed by the processor, cause:
    determining a backward linking element in the first content component, wherein selection of the backward linking element causes the client to generate a request for a previously sent response, which response is indicated by information previously stored in a record of the data structure associated with another response identification;
    retrieving a second other response identification stored in a back-pointer field associated with said another response identification; and
    associating the second other response identification with the backward linking element in the first response such that the request includes the second other response identification.

34. An apparatus as recited in claim 33, wherein the previously sent response is a most recently sent response; and said another response identification is the same as said response identification.

35. An apparatus as recited in claim 28, further comprising one or more additional instructions which, when processed by the processor, cause:
    determining a parallel linking element in the first content component, wherein selection of the parallel linking element causes the client to generate a request for another response at the same level of a navigational hierarchy as the first response;
    associating said response identification with the parallel linking element in the first response such that the other request includes said response identification.

\* \* \* \* \*